Figure 1:
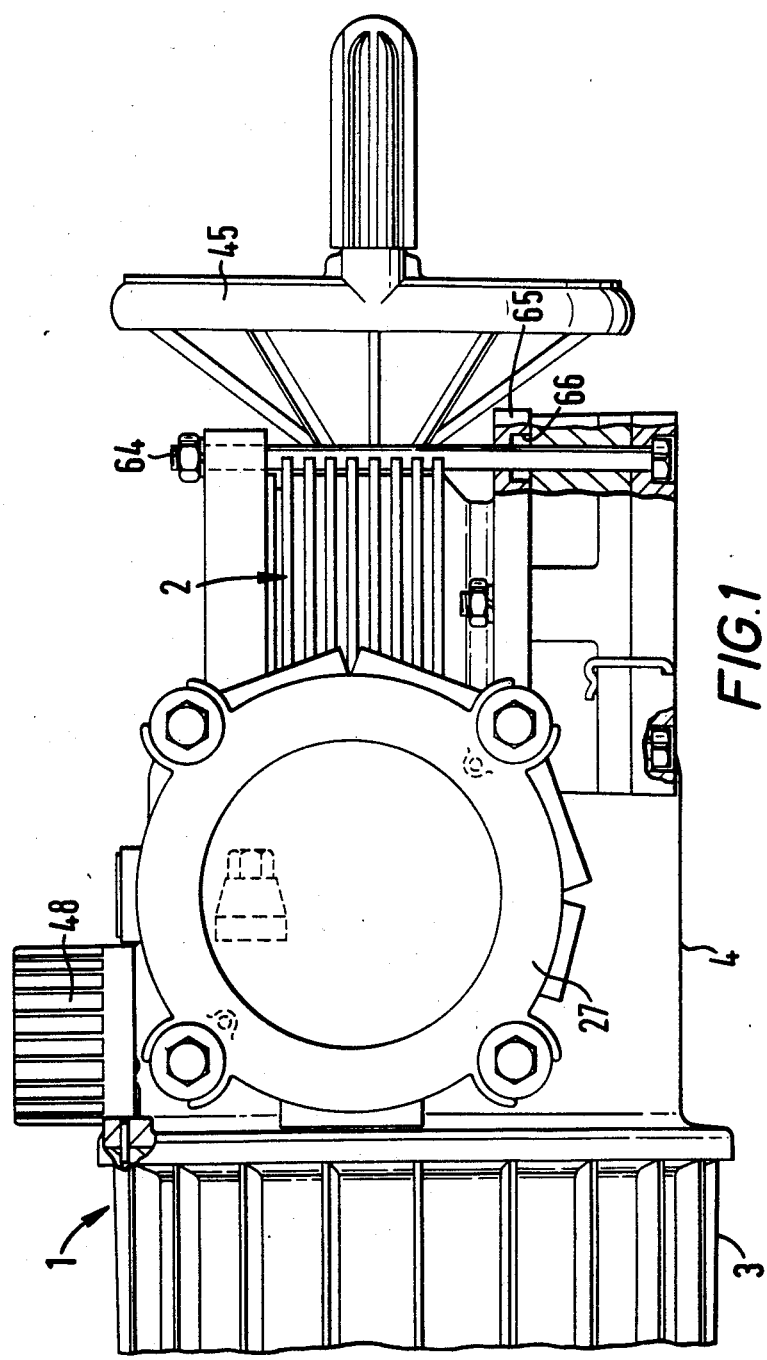

United States Patent [19] [11] Patent Number: 4,584,902
Fry [45] Date of Patent: Apr. 29, 1986

[54] VALVE ACTUATORS

[75] Inventor: Jeremy J. Fry, Bath, England

[73] Assignee: Rotork Controls Limited, Bath, England

[21] Appl. No.: 500,008

[22] Filed: Jun. 1, 1983

[30] Foreign Application Priority Data

Jun. 12, 1982 [GB] United Kingdom ............... 8217118

[51] Int. Cl.⁴ ..................... F16H 57/02; H02K 5/00
[52] U.S. Cl. ................................. 74/606 R; 310/89; 251/129.11
[58] Field of Search ............... 310/83, 89; 74/606 R, 74/425; 251/133, 134, 135

[56] References Cited

FOREIGN PATENT DOCUMENTS 1450447 9/1976 United Kingdom .

Primary Examiner—William E. Lyddane
Assistant Examiner—Gerald Anderson
Attorney, Agent, or Firm—Hayes, Davis & Soloway

[57] ABSTRACT

A valve actuator is disclosed which comprises only two housings, namely a first housing defining a single enclosure for a reversible electric motor, electrical control gear associated with the motor and torque control means and travel limit switch mechanism, and a second housing comprising a gear box containing reduction gearing.

11 Claims, 4 Drawing Figures

VALVE ACTUATORS

This invention relates to valve actuators.

The invention is more particularly concerned with relatively large sized valve actuators which even at the smaller end of the range are capable of providing a valve operating torque typically of the order of 3 kg.m and at the larger end of the range are capable of providing a valve operating torque of the order of 1000 kg.m. Such valve actuators find wide application for example in the thermal power generation, gas storage and oil storage industries as well as having marine, penstock and other specialized applications.

Such valve actuators generally have an output shaft driven by a reversible electric motor through gearing, e.g. worm and worm-wheel gearing, and which can rotate the output shaft in either direction to open or close a valve drivingly connected by a valve stem to the output shaft.

It is customary for valve actuators of the kind with which the present invention is concerned to comprise three or four housings separably joined to each other. These housings respectively comprise:
1. the electric motor housing.
2. the control gear housing containing the control gear associated with the electric motor and also the terminal block.
3. the gear box
4. the torque and travel limit switch housing.

Since the valve actuators generally operate in arduous environments it is often necessary for them to be waterproof and/or flameproof. Having such a plurality of housings as described above does complicate and render expensive the waterproofing and flameproofing operations.

According to the present invention a valve actuator has only two housings, (a) a first housing containing (1) a reversible electric motor (2) electrical control gear associated with the motor, and (3) torque control means and travel limit switch mechanism, and (b) a second housing comprising a gear box containing reduction gearing.

Figure 2:
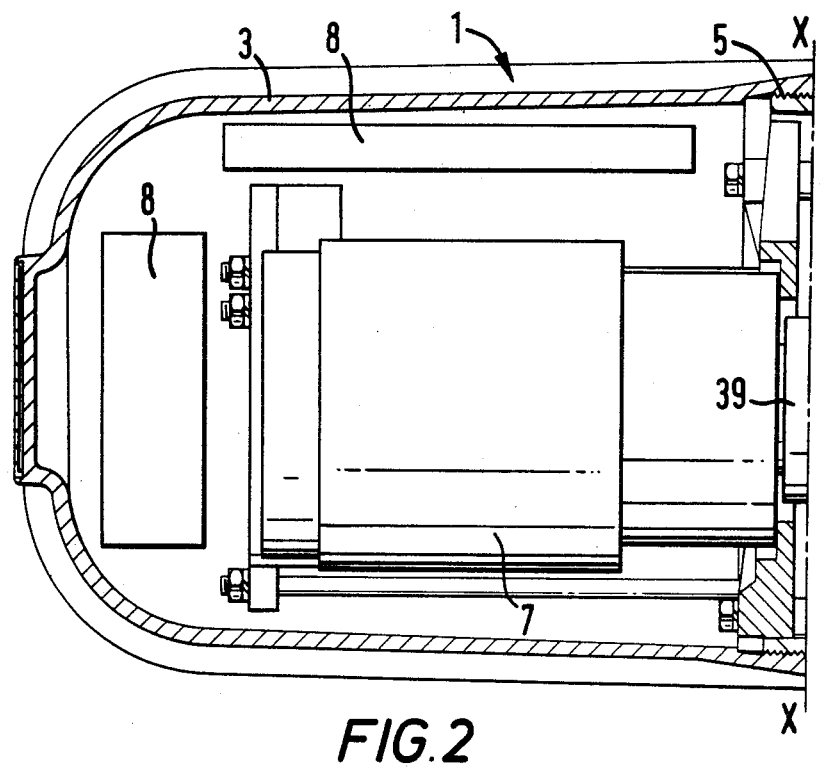
Figure 3:
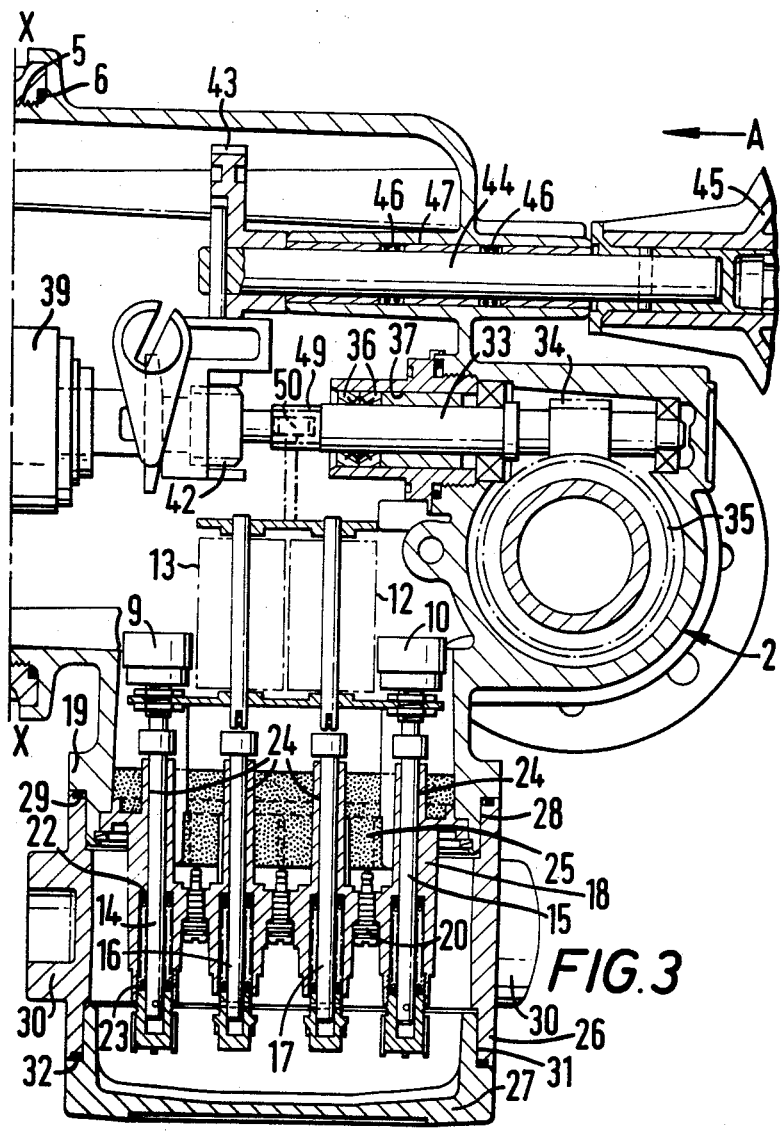
Figure 4:
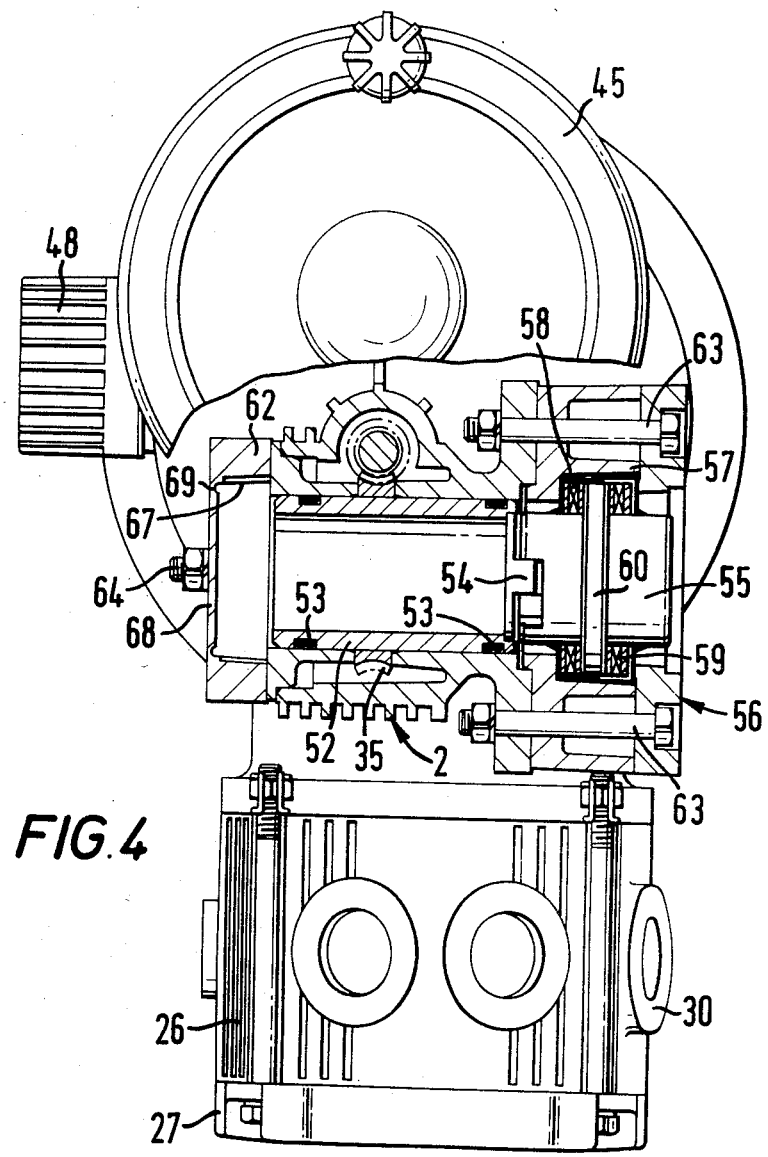

Further features of the invention will become apparent from the following description with reference to the accompanying drawings of one valve actuator construction in accordance with the invention. In the drawings:

FIG. 1 is a side view of the actuator with part broken away,

FIGS. 2 and 3 when joined together on the line X—X show a longitudinal plan section through the actuator and, FIG. 4 shows a part end view of the actuator looking in the direction of arrow A in FIG. 3 and a part-sectional view to illustrate one form of drive output from the actuator.

Referring to the drawings, the valve actuator has a first housing 1 which defines a single enclosure and which for convenience will be termed the electrical housing and a second housing 2 comprising an oil-filled gear box.

The housing 1 is in two parts 3 and 4 which are joined together through interengaging screw-threads 5. The screw-threads 5 provide a flame-path between them for the purpose of flameproofing in known manner. The housing parts 3 and 4 are also sealed to each other at their joint by sealing ring 6. The housing 1 contains a reversible variable speed electric motor 7 and its associated control gear which is represented by blocks 8 in FIG. 2. The control gear is for example as described in British Patent Application No. 8210716 (Pat. No. 2101355) which corresponds to U.S. Pat. No. 4,445,075. As is also described in this British Patent Application there are associated with the control gear manually adjustable speed setting and torque setting devices. In FIG. 3 of the accompanying drawings these are represented by potentiometers 9 and 10. Also associated with the control gear are manually adjustable travel limit switch mechanisms 12 and 13 (FIG. 3). These switch mechanisms 12 and 13 are, for example, of the construction described in British Patent Application No. 8308545 (Publication No. 2119172) U.S. patent application Ser. No. 479,201. The manual adjusters for the potentiometers 9 and 10 are spindles 14 and 15 and the manual adjusters for the switch mechanisms 12 and 13 are spindles 16 and 17. The spindles 14 to 17 extend from the interior of the housing 1 to the outside of the actuator through respective bores in a bulkhead 18, which is of rigid plastics material and sealingly fits like a bung in a circular outlet port 19 in the housing 1. Sealing of the port 19 additional to that provided by the tight fitting of the bulkhead 18 is provided by the potting composition 25. The bulkhead 18 in this example is also conveniently formed as a terminal block having terminals 20 by means of which the external electrical connections are made to the items of electrical equipment within the housing 1.

Each of the spindles 14 to 17 is sealed in its bore against the ingress of fluid by a double sealing arrangement comprising sealing rings 22 and 23. The portions 24 of the bores through which the spindles 14 to 17 pass provide flame paths for flameproofing purposes.

The heads of the spindles 14 to 17 and the terminals 20 are provided with a cover comprising a cylindrical box 26 with a lid 27. The mouth of the outlet port 19 fits spigot fashion into box 26 to provide flame path 28 for flame proofing and seal with the housing 1 through sealing ring 29. The box 26 has cable entries 30 with knock-out membranes which are removed from those cable entries selected for the passage of cables into the box 26. The lid 27 fits spigot fashion into the box 26 to provide a flame path 31 for flameproofing and is also sealed to the box by sealing ring 32. The gear box 2 is formed integrally with the housing part 3 of the electrical housing 1. Extending into the gear box 2 from its driving connection with the electric motor 7 is a worm shaft 33. Within the gear box 2 the worm shaft carries a worm 34 which meshes with a worm wheel 35 to provide a reduction gearing for the actuator. The wormshaft 33 seals with the gear box 2 through seals 36 and has a flame path 37 for flameproofing.

The output shaft of the motor 7 connects with the worm shaft 33 via a clutch 39 which forms part of a hand-auto mechanism of the form described in British Patent Application No. 8311578 (Publication No. 2120349) which corresponds to U.S. patent application Ser. No. 490,714. The hand-auto mechanism also has a gear member 42 for meshing with a gear member 43 mounted on a shaft 44 which at a position outside the actuator carries a hand wheel 45. The shaft 44 is sealed in the housing 1 by seals 46 and has a surrounding flame path 47 between the seals 46. The hand-auto mechanism is operated by hand knob 48 which has an operating spindle extending through the housing 1 to connect with the hand-auto mechanism within the housing 1.

The spindle is sealed to the housing 1 and has a flame path for flameproofing in similar manner to the spindles 14 to 17. Operation of the hand knob 48 acts to brake the motor 7 and to disengage the clutch 39 and cause meshing of gear members 42 and 43 so that the actuator can be operated by the hand wheel 45. As described in British Patent Application No. 8311578 re-starting of the motor 7 causes automatic re-engagement of the clutch 39 and disengagement fo the gear members 42 and 43 to reconnect the drive from the motor 7 to the worm shaft 33 and disengage it from the hand wheel 45.

As described in British Patent Application No. 8308545 the travel limit switch mechanisms 12 and 13 are driven from the main actuator drive. Conveniently in this construction of actuator the drive is provided through a second worm 49 on the worm shaft 33 with which meshes a worm wheel 50 mounted on the driving shaft for the switch mechanisms 12 and 13.

Referring to FIG. 4, this shows one form of drive output from the actuator in which the actuator is adapted to take thrust from a valve stem connected to it as well as torque. The worm wheel 35 is shown mounted on a hollow cylindrical drive column 52 which is rotationally mounted in the gear box 2 and has seals 53. At its drive end the column 52 connects via dogs 54 with a drive nut 55 having an internal thread for drivingly engaging with a thread on a valve stem (not shown). Thus, as the valve is opened and closed the valve stem moves through the drive nut 55 and into and out of the column 52. The drive nut 55 forms part of a thrust base 56. The thrust base 56 comprises a fixed base member 57 housing thrust bearings 58 and 59 between which a flange 60 on the drive nut 55 locates.

The arrangement shown in FIG. 4 is conventional except that the thrust base 56 and cover 62 for the other end of the column 52 are secured to the gear box 2 by tie bolts 63 and 64, the tie bolts 64 as seen in FIG. 1 being common to the thrust base 56 and the cover 62. Conventionally the cover 62 and the thrust base 56 are separately secured in position by bolts screwing into tapped holes in the bear box. Instead of providing a thrust base 56 other forms of drive connector block may be provided to suit the valve users requirements i.e. wherein the gear box has a separately formed drive connector block mounted on the gear box by tie bolts at least some of which are used in common to secure said cover.

In some cases when the valve actuator is required only to take torque and not thrust, the separate drive connector block is not required. The cover 62 is still secured by tie bolts to the gear box 2, thus saving the cost of providing tapped holes in the gear box for securing the cover. To house the heads of the tie bolts the connecting flange 65 on the gear box is provided with recesses 66. (see FIG. 1)

Referring particularly to FIG. 4, the cover 62 has a tapering internal thread 67 and the top 68 of the cover has a line of weakness 69 so that it can be knocked out.

By inverting the cover 62 a cover tube can be screwed into it in order to extend the length of valve stem which can be accommodated.

I claim:

1. A valve actuator comprising only two housings, namely (a) a first housing defining a single enclosure for (1) a reversible electric motor, (2) electrical control gear associated with the motor and (3) torque control means and travel limit switch mechanism and (b) a second housing comprising a gear box containing reduction gearing, a main drive extending from the electric motor to the reduction gearing and wherein the first housing has an outlet opening sealingly closed by a terminal block through which pass manual adjustment members for the travel limit switch mechanism.

2. A valve actuator according to claim 1, wherein all manual adjustment members pass through said terminal block 3. A valve actuator according to claim 1 wherein additional sealing is provided at said outlet opening by a potting compound disposed behind the terminal block.

4. A valve actuator according to claim 1, wherein the terminal block is provided with a cover sealed to said outlet opening to enclose ends of said adjustment members and terminals on the outer side of the terminal block.

5. A valve actuator according to claim 4, wherein said cover has a removable lid sealingly secured to it.

6. A valve actuator according to claim 1 wherein the travel limit switch mechanism is driven from the main drive through a second reduction gearing contained within said first housing.

7. A valve actuator according to claim 6, wherein said main drive includes a worm shaft extending from a connection with the electric motor shaft into the gear box where it carries a worm meshing with a worm wheel to form the first mentioned reduction gearing and wherein the worm shaft carries a further worm meshing with a worm wheel to form said second reduction gearing.

8. A valve actuator according to claim 1, wherein the gear box houses a drive column and wherein one end of said drive column is closed by a cover which is secured to the gear box by tie bolts.

9. A valve actuator according to claim 8, wherein the gear box has a separately formed drive connector block mounted on the gear box by tie bolts at least some of which are used in common to secure said cover.

10. A valve actuator according to claim 9, wherein said gear box is provided at the end of the column opposite the cover with recesses for the heads of tie bolts so that the cover can be secured in position by the tie bolts when a separately formed drive connector block is not provided.

11. A valve actuator according to claim 8, wherein the cover has a knock-out top and an internal thread into which an extension cover tube can be screwed.

* * * * *